United States Patent [19]

Kolawa et al.

[11] Patent Number: 5,842,019

[45] Date of Patent: Nov. 24, 1998

[54] METHOD AND SYSTEM FOR DYNAMICALLY DETECTING LEAKED MEMORY SPACE IN A COMPUTER PROGRAM

[75] Inventors: Adam K. Kolawa, Sierra Madre; Wendell T. Hicken, Whittier, both of Calif.

[73] Assignee: Parasoft Corporation, Monrovia, Calif.

[21] Appl. No.: 712,931

[22] Filed: Sep. 13, 1996

[51] Int. Cl.$^6$ .................................................. G06F 12/00
[52] U.S. Cl. ............................................................ 395/701
[58] Field of Search ............................................. 395/701

[56] References Cited

U.S. PATENT DOCUMENTS 5,644,709   7/1997   Austin ................................. 395/185.06
5,689,707  11/1997   Donnelly ................................. 395/622

OTHER PUBLICATIONS

Collinson, Peter, A purveyor of fine programs. (Pure Software's Purify 3.0–Beta–1 debugging/testing software), EXE, v9, n2, p50(4), Apr. 1994.

Brooks, Roseann McGrath, Insightful debugger (Parasoft Corp. introduces Insight automatic debugging software), DEC Professional, v12, n8, p10(1), Aug. 1993.

Schulz, Peter, 'Debugging Tools Tame Overwrite Bugs; C–Debug, memCheck Insert Debugging Statements Directly into a Program's Source Code', PC Week, v9, n2, p92(2), Jan. 13, 1992.

*Primary Examiner*—Allen R. MacDonald
*Assistant Examiner*—Lisa Stevens
*Attorney, Agent, or Firm*—Christie, Parker & Hale, LLP

[57] ABSTRACT

A method using a computer and a system for dynamically detecting leaked memory space in a computer program. The computer program comprises instrumentation routines for communicating runtime memory space conditions to a dynamic debugging system and has a memory space for storing dynamic data values. A dynamic leak search is performed for tracking allocated memory space using reference counting. A static leak sweep is performed for scanning blocks of the memory space to determine whether each such block of the memory space is reachable from another such block of the memory space.

20 Claims, 11 Drawing Sheets

```
1    void  store_pointer(char *data);
2
3    int main()
4    {
5        char   *a;
6
7        a = new char[10];
8        store_pointer(a);
9        a = 0;
10       return 0;
11   }
```

FIG. 4A

```
1    void  store_pointer(char *data);
2
3    int main()
4    {
5        char   *a;
6        _Insight_decl_lwptr(_Insight_fid_1, 5L, 1, (void *) &a 0, 2);
7
8        a = new char[10];
9        _Insight_assigna(1, (void **) &a, (void *) a,
                 (unsigned int) (10 * sizeof(char +)),
                 (unsigned int) sizeof(char), 4161);
10       _Insight_call(39241, 1, (void *) &a, 4097);
11       store_pointer(a);
12       _Insight_after_call();
13       _Insight_assign_ptr2(2, (void **) &a, (void *) 0, (void *) 0);
14       a = 0;
15       _Insight_prog_end();
16       return 0;
17   }
```

FIG. 4B

```
1    struct A {
2        A    *next;
3    };
4
5    void leak() {
6        A    *a, *b;
7
8        a = new A;
9        b = new A;
10       a->next = b;
11       b->next = a;
12       return;
13   }
14
15   int main() {
16       leak();
17       return 0;
18   }
```

FIG. 5A

```
1    struct A {
2        A    *next;
3    };
4
5    void leak() {
6        A    *a, *b;
7        _Insight_decl_lwptr(_Insight_fid_1, 6L, 1, (void *) &a, 0, 2);
8        _Insight_decl_lwptr(_Insight_fid_1, 6L, 1, (void *) &b, 0, 2);
9
10       a = new A;
11       _Insight_assigna(1, (void **) &a, (void *) a,
                 (unsigned int) sizeof(struct A),
                 (unsigned int) sizeof(struct A), 4097);
12       b = new A;
13       _Insight_assigna(1, (void **) &b, (void *) b,
                 (unsigned int) sizeof(struct A),
                 (unsigned int) sizeof(struct A), 4097);
14       _Insight_assign_ptr1(2, (void **) &a->next, (void **) &b, (void *) b);
15       a->next = b;
16       _Insight_assign_ptr1(2, (void **) &b->next, (void **) &a, (void *) a);
17       b->next = a;
18       _Insight_func_end(1);
19       return;
20   }
21
22   int main() {
23       leak();
24       return 0;
25   }
```

FIG. 5B

METHOD AND SYSTEM FOR DYNAMICALLY DETECTING LEAKED MEMORY SPACE IN A COMPUTER PROGRAM

FIELD OF THE INVENTION

The present invention relates to a method and system for detecting leaked memory space in a computer program and, more particularly, to a method and system for detecting leaked memory space in a computer program by employing a hybrid memory searching and memory sweeping technique.

BACKGROUND OF THE INVENTION

The dynamic management of memory space within a running computer program has long posed a challenge to programmers. As a general rule, wasted memory space must be avoided because computer memory ultimately remains a finite machine resource. A corollary to this rule requires that dynamic memory space that is temporarily allocated must be efficiently tracked and reclaimed.

One problem in dynamic memory management is the avoidance of "leaked" memory space. A memory leak is a block of dynamic memory which cannot be freed for use by the running program because the reference pointers to the memory block have been lost. Repeated generation of leaked memory space can cause a program to run out of memory or cease functioning altogether, perhaps with disastrous results.

Conventional approaches to detecting leaked memory space employ various forms of memory "sweeping" and are primarily limited to post-execution program analysis. Typically, the problem is addressed merely by generating a map of the memory space, that is, a memory "dump," showing the state of the memory blocks as they stood upon the termination of program execution. The usefulness of a memory dump is often nominal as it is based primarily upon static considerations and ignores valuable runtime information.

Therefore, what is needed is an approach to detecting leaked memory space in a computer program by employing a combination of runtime, dynamic memory searching and post-execution memory sweeping. Such an approach would enable the observation and analysis of dynamic program behavior as an adjunct to conventional memory sweeping.

SUMMARY OF THE INVENTION

Accordingly, the present invention enables the above problems to substantially be overcome by providing a method and system for dynamically detecting leaked memory space in a computer program.

Embodiments of the present invention are a method using a computer for, a system for and a storage medium encoded with computer readable program code for dynamically detecting leaked memory space in a computer program. The computer program comprises instrumentation routines for communicating runtime memory space conditions to a dynamic debugging system and has a memory space for storing dynamic data values. A dynamic leak search is performed for tracking allocated memory space using reference counting. A static leak sweep is performed for scanning blocks of the memory space to determine whether each such block of the memory space is reachable from another such block of the memory space.

A further embodiment of the present invention is a method using a computer for instrumenting a computer program to facilitate dynamic detection of leaked memory space in the computer program. The computer program is represented by code segments of source code written in a programming language. Each of the code segments of the source code are analyzed for determining an appropriate type of instrumentation routine for the computer program. A location within the source code is identified for placing a procedure call to the appropriate type of instrumentation routine. The instrumentation routine comprises one of a memory searching routine or a memory scanning routine. Each code segment of the source code is instrumented with the procedure call. Object code is generated from the instrumented source code for execution on the computer in conjunction with a dynamic debugging system.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIGS. 4A and 4B respectively show computer source code listings before and after instrumentation for performing a leak search;

FIGS. 5A and 5B respectively show computer source code listings before and after instrumentation for performing a leak sweep;

DETAILED DESCRIPTION

Figure 1:
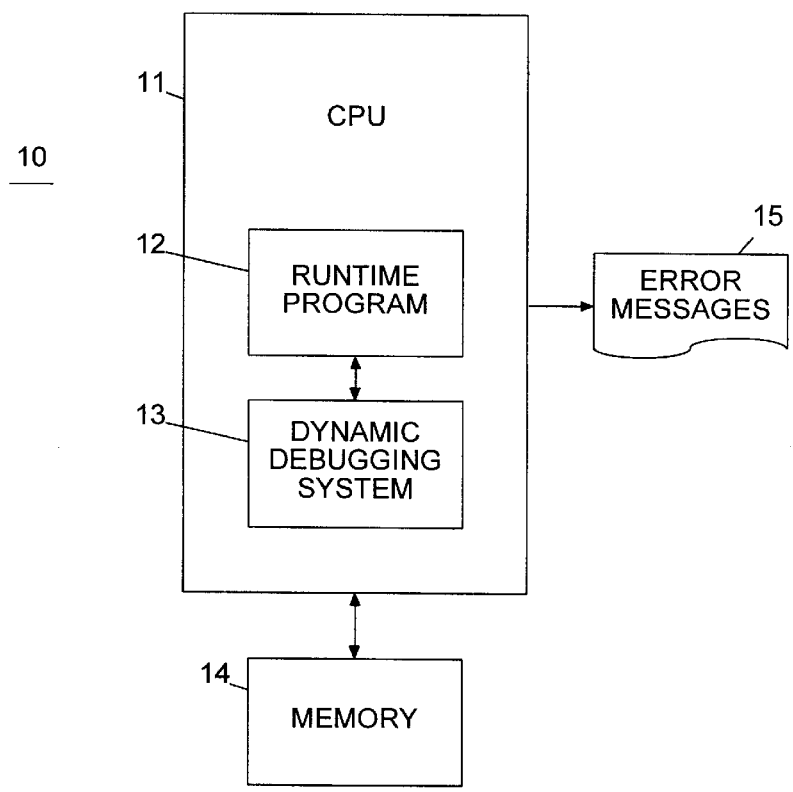
FIG. 1 is a functional block diagram of a system for dynamically detecting leaked memory space in a computer program constructed in accordance with the present invention.

Referring to FIG. 1, a functional block diagram of a system 10 for dynamically detecting leaked memory space in a computer program constructed in accordance with the present invention is shown. The system 10 comprises a central processing unit (CPU) 11 interconnected to a memory 14, such as a random access memory, and a device for displaying error messages 15, such as a printer or display monitor.

The computer program is instrumented to generate a runtime program 12, such as described in related U.S. Pat. No. 5,581,696, the disclosure of which is incorporated herein by reference. The runtime program 12 contains the source code of the original computer program augmented with additional function or procedure calls required to communicate runtime conditions to a dynamic debugging system 13. The instrumentation includes appropriate checks for runtime or dynamic errors or programmatic anomalies that are communicated to the dynamic debugging system 13 in the form of debugging output and error messages, although other forms of instrumentation are feasible. The particular instrumentation required to perform memory leak searching and sweeping in accordance with the present invention is further described hereinbelow beginning in FIGS. 4A and 4B.

Figure 2:
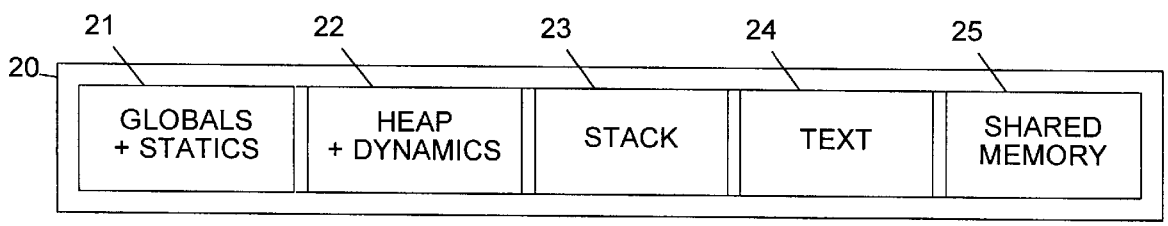
FIG. 2 is a block diagram, by way of example, of the memory space used by a computer program.

Typically, memory space is needed for storing the various parts of runtime program 12, including the generated target program code (or text), static and dynamic data objects, and a control stack for maintaining procedure activation records. Referring to FIG. 2, a block diagram of one manner, by way of example, of organizing the memory space 20 of the runtime program 12 is shown, although other forms of memory space organization are possible. The memory space 20 is divided into five separate areas. First, memory space is allocated, preferably at compile time, for storing global and statically allocated data objects 21. Next, memory space is allocated for the heap and dynamically allocated data objects 22 and the stack 23. Typically, the heap and dynamic data object storage area 22 and stack 23 occupy a contiguous block of memory space 20, although the heap and dynamic storage area 22 grows "downward," that is, towards higher memory addresses, and the stack 23 grows "upward," that is, towards lower memory addresses. The particular form of memory organization is programming language dependent and not all languages require memory space for a heap or stack. Next, the program code is stored in the text storage area 24. Finally, if employed by the runtime program 12, memory space area is provided for shared memory 25. A problem arises during the execution of runtime program 12 when dynamically allocated memory space, such as from the heap and dynamic storage area 22, the stack 23 or the shared memory 24, is "leaked" due to dereferencing as further described hereinbelow.

Figure 3:
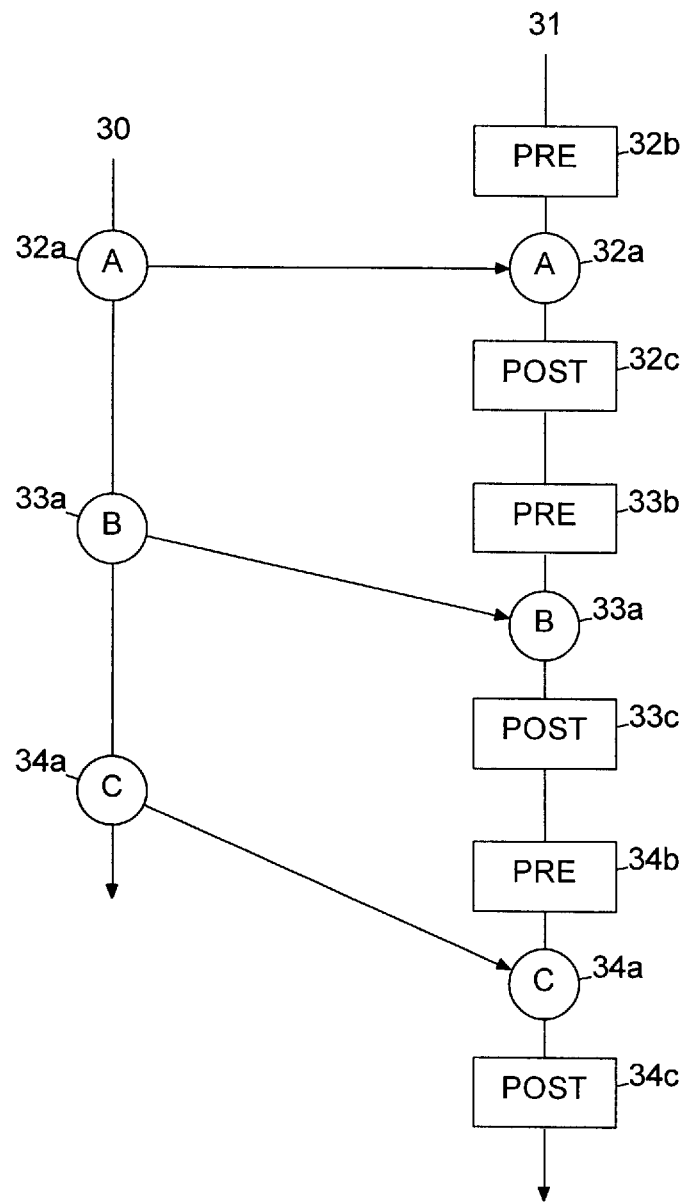
FIG. 3 is a flow diagram showing, by way of example, abstract computer program segments before and after instrumentation.

To dynamically detect leaked memory, the runtime program 12 is augmented with instrumentation for communicating runtime information to the dynamic debugging system 13. Referring to FIG. 3, a flow diagram, by way of example, of abstract computer program source code segments before and after instrumentation is shown. In this example, an uninstrumented program segment 30 comprises three groups of program statements A, B, and C, respectively represented by circles 32a, 33a and 34a. Before any instrumentation is introduced, the source code comprising the computer program is analyzed for determining the appropriate types of instrumentation routines required and for identifying the location within the source code for placing the function or procedure calls to the instrumentation routines. In the described embodiment, the uninstrumented source code 30 is instrumented to generate instrumented source code 31 containing instrumentation routines for dynamically preprocessing and postprocessing runtime information, although, preprocessing and postprocessing may not both be required in every case. As shown, code segment 32a is instrumented with preprocessing routine 32b and postprocessing routine 32c. Likewise, code segments 33a and 34a are respectively instrumented with preprocessing routines 33b and 34b and postprocessing routines 33c and 34c. The particular type of instrumentation routines employed are application dependent based on the requirements of the particular dynamic debugging system 13 used.

In the described embodiment, a hybrid technique for dynamically detecting leaked memory space, or simply, "leaks," is employed using both leak searching and leak sweeping instrumentation routines. With leak searching, a "reference count" of the number of pointer variables that are currently pointing to a given block of allocated memory space is maintained. Each manipulation of a pointer variable to a dynamic memory block is counted. In this manner, memory space is "searched" and noncyclic leaks are detected. A drawback of reference counting is that it is a poor technique for detecting a cycle. For example, suppose a memory block A contains a pointer a and a second memory block B contains another pointer b. A cycle occurs when, for instance, pointer a points to memory block B and pointer b points to memory block A. In this case, both dynamic memory blocks have a reference count of one but neither is accessible. A solution to this problem is to perform a static memory sweep by scanning all available memory blocks for addresses and unless the memory block is reachable from another "reachable" memory block, the memory block is considered not reachable, hence, leaked, regardless of the reference count. Consequently, the leak is detected.

Referring to FIGS. 4A and 5A, source code listings of example computer programs before instrumentation are shown. Referring to FIGS. 4B and 5B, source code listings of example computer programs after instrumentation are shown.

FIG. 4A shows a first example computer program written in the C++ programming language which declares an external procedure store_pointer () (line 1) and a main program main () (lines 3–11). The same program is shown in FIG. 4B augmented with procedure calls to the necessary instrumentation routines for performing dynamic leak detection in accordance with the present invention. Referring to FIG. 4B, a postprocessing instrumentation routine _Insight_decl_lwptr () is called (line 6) after the declaration of a dynamic pointer variable a (line 5). A second postprocessing instrumentation routine _Insight_assigna () is called (line 9) after the assignment of dynamically allocated memory space to the dynamic pointer variable a (line 8). Both a preprocessing instrumentation routine _Insight_call () and a postprocessing instrumentation routine _Insight_after_call () are called (lines 10 and 12, respectively) for a procedure call (line 11) to the externally declared procedure store_pointer () (line 1). Both preprocessing and postprocessing instrumentation routines are required for communicating the status of the memory space before and after the externally declared procedure store_pointer () is called because it is not instrumented and therefore not in communication with the dynamic debugging system 13. A preprocessing instrumentation routine _Insight_assign_ptr2 () is called (line 13) before the assignment of a static value to the dynamic pointer variable a (line 14). Finally, a postprocessing instrumentation routine _Insight_prog_end () is called (line 15) to perform a leak sweep upon the completion of the main program main () (lines 3–17).

FIG. 5A shows a second example computer program also written in the C++ programming language which declares a data structure A (lines 1–3), a procedure leak () (lines 5–13) and a main program main () (lines 15–18). The same program is shown in FIG. 5B augmented with procedure calls to the necessary instrumentation routines for performing dynamic leak detection in accordance with the present invention. Referring to FIG. 5B, two postprocessing instrumentation routines _Insight_decl_lwptr () are called (lines 7 and 8, respectively) after the declaration of a pair of dynamic pointer variables a and b (line 6). A second postprocessing instrumentation routine _Insight_assigna () is called (line 11) after the assignment of dynamically allocated memory space to the dynamic pointer variable a (line 10). A third postprocessing instrumentation routine _Insight_assigna () is called (line 13) after the assignment of dynamically allocated memory space to the dynamic pointer variable b (line 12). A preprocessing instrumentation routine _Insight_assign_ptr () is called (line 14) before the reassignment of the memory block address stored in dynamic pointer variable b to the dynamic structure pointer a-<next (line 15). A second preprocessing instrumentation routine _Insight_assign_ptr1 () is called (line 16) before the assignment of the memory block address stored in dynamic pointer variable a to the dynamic structure pointer b->next (line 17). Finally, a postprocessing instrumentation routine _Insight_prog_end () is called (line 18) to perform a leak sweep upon the completion of the procedure leak () (lines 5–20).

Figure 6:
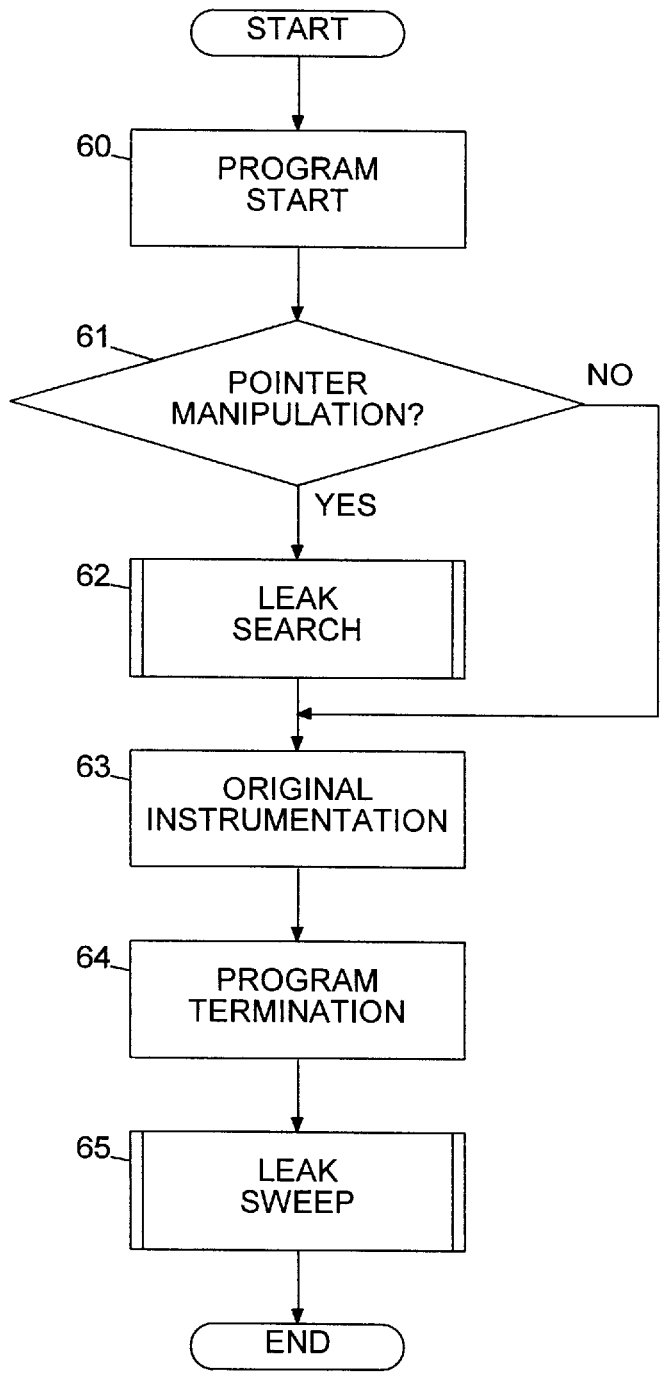
FIG. 6 is a flow diagram of a method for dynamically detecting leaked memory space in a computer program performed in accordance with the present invention.

Referring to FIG. 6, a method for dynamically detecting a memory leak constructed in accordance with the present invention is shown. A hybrid technique of leak searching using memory searching (also known as "reference counting") and memory sweeping is employed. The purpose of this method is to enable the dynamic debugging system 13 to automatically detect leaks at runtime with incomplete information about the status of memory space usage. Execution of the runtime program 12 starts in the normal fashion (block 60). If the manipulation of a dymanic pointer variable occurs (block 61), a leak search is performed (block 62) as further described hereinbelow in FIG. 7. Next, the original instrumentation routines for performing other types of dynamic debugging are optionally performed (block 63). Upon program termination (block 64), a leak sweep is performed (block 65) as further described hereinbelow in FIG. 11.

Figure 7:
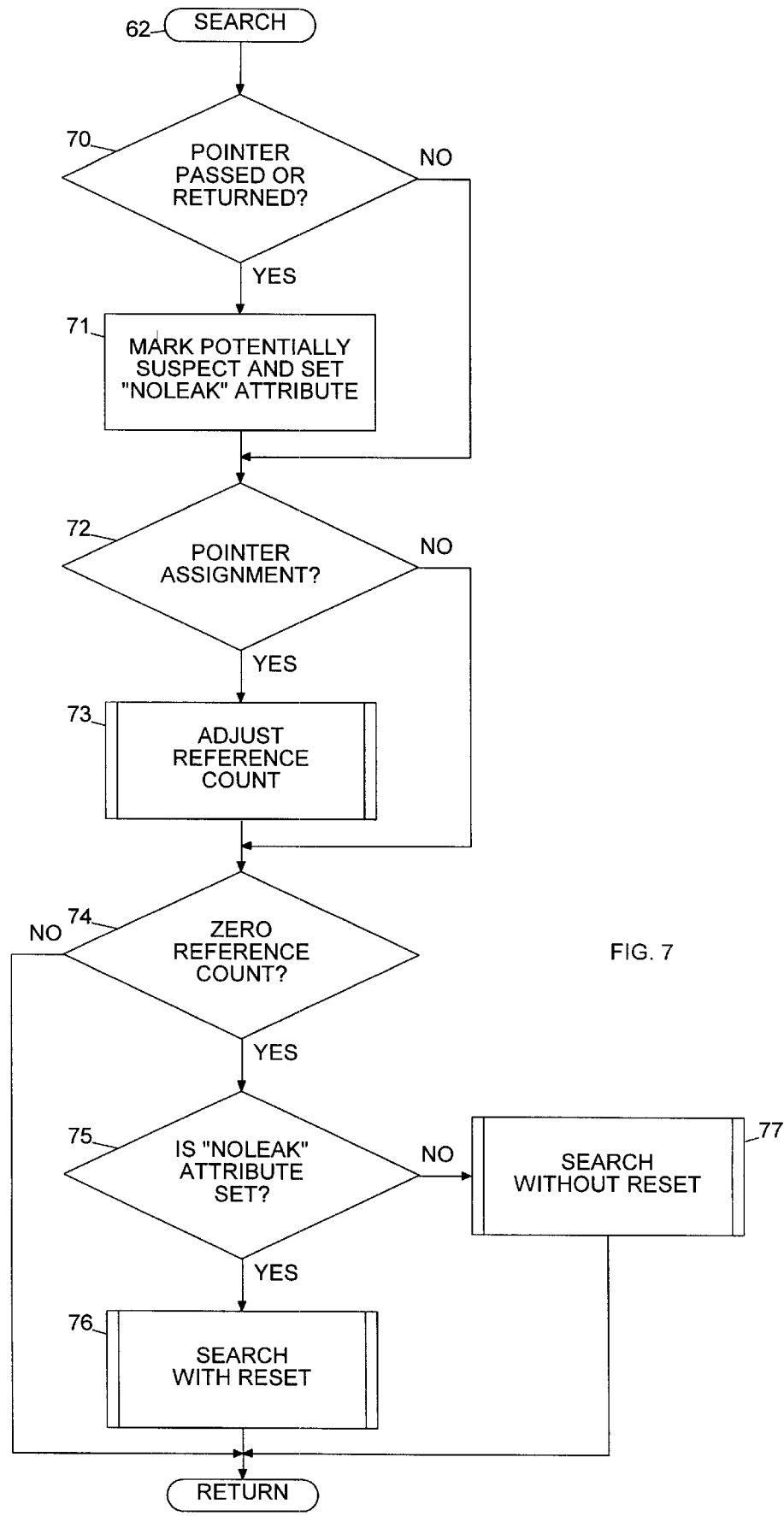
FIG. 7 is a flow diagram of a leak search routine.

Referring to FIG. 7, the routine for performing leak searching (block 62) is shown. Its purpose is to track allocated memory space using reference counting. If the value stored in a pointer variable is passed or returned (block 70), the pointer variable is marked as potentially suspect and a "NoLeak" attribute is set (block 71). Each time a memory pointer is passed to or returned from uninstrumented code, the pointer is marked as potentially suspect because the uninstrumented code may have saved a handle to a memory block which would otherwise go undetected by the dynamic debugging system 13. This is noted by the "NoLeak" attribute. If the pointer variable is assigned a new value (block 72), the reference count is adjusted (block 73) as further described hereinbelow in FIG. 8. If the reference count for the pointer variable becomes zero (block 74) and the "NoLeak" attribute is set (block 75), the memory space is searched with a potential reset of the "NoLeak" attribute (block 76) as further described hereinbelow in FIG. 9. Otherwise, if the reference count equals zero (block 74) yet the "NoLeak" attribute is not set (block 75), a memory search without a possible reset of the "NoLeak" attribute is performed (block 77) as further described hereinbelow in FIG. 10. Note other methods of reference counting are possible, so long as some predetermined condition is used for indicating that a memory leak may exist.

Figure 8:
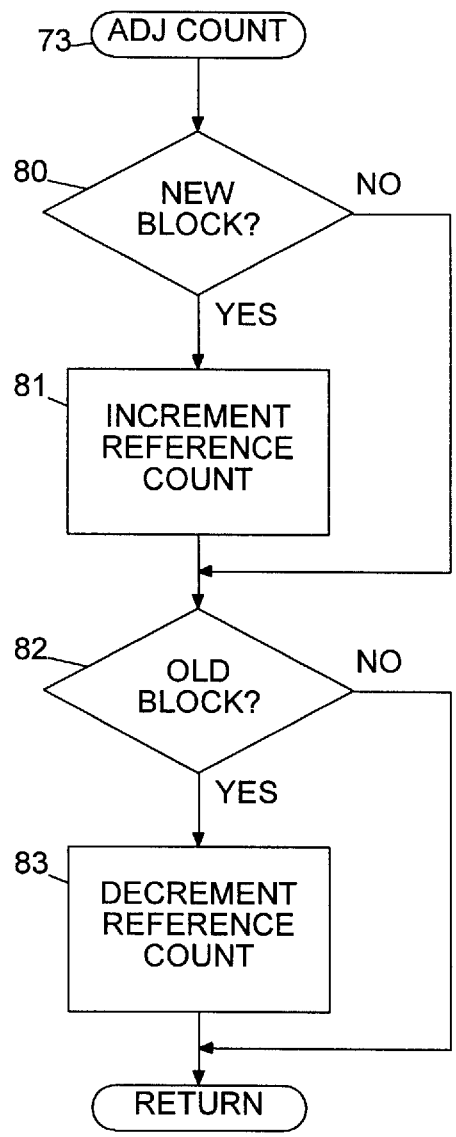
FIG. 8 is a flow diagram for an adjust reference count routine.

Referring to FIG. 8, the routine for adjusting the reference count (block 73) is shown. Its purpose is to perform straight reference counting for maintaining a count of references to dynamically allocated memory blocks. If a pointer variable points to a newly allocated memory block (block 80), the reference count is incremented by one (block 81). If a new value has been assigned to the pointer variable, thereby eliminating the reference to the old memory block (block 82), the reference count is decremented by one (block 83).

Figure 9:
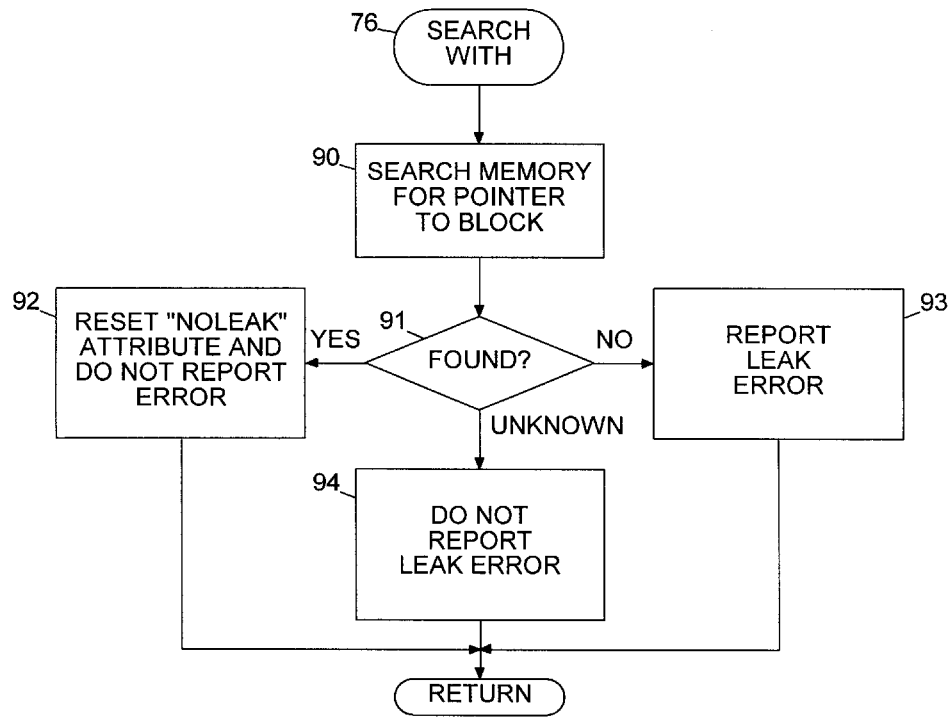
FIG. 9 is a flow diagram of a search with reset routine.

Referring to FIG. 9, the routine for searching memory space with an optional reset of the "NoLeak" attribute (block 76) is shown. Its purpose is to search the memory space for a pointer variable that points to the memory block in question for detecting a leak. First, the memory space is searched for a pointer to the memory block in question (block 90). If the pointer is found (block 91), the memory block is not leaked and, therefore, the "NoLeak" attribute is reset and no leak error is reported (block 92). If no memory block is found (block 91), a leak exists and a leak error is reported (block 93). If it cannot be determined whether a pointer exists, that is, it is "unknown" (block 91), no leak error is reported (block 94). The unknown case occurs when the symbol table is not being used or the memory allocation instruction is not trapped. In the described embodiment, these are options for the dynamic debugging system 13 that can be set by the user. In addition, some dynamic debugging systems employ symbol readers that have not been fully implemented and are only able to sweep some memory blocks. Since all memory blocks are not swept, a conclusive "YES" can only be issued if a pointer is found. Otherwise, the answer is "unknown" at best since all of the memory blocks were not searched.

Figure 10:
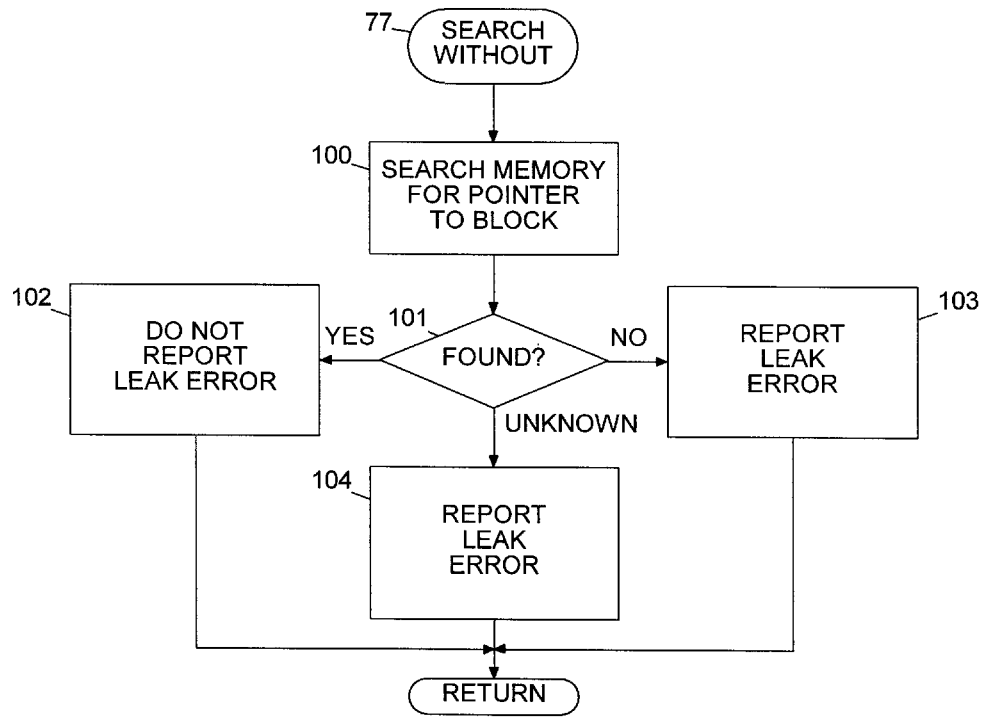
FIG. 10 is a flow diagram of a search without reset routine.

Referring to FIG. 10, the routine for searching memory space without an optional reset of the "NoLeak" attribute (block 77) is shown. Its purpose is the same as the routine of FIG. 9 except the "NoLeak" attribute is not potentially reset. First, the memory space is searched for a pointer to the memory block in question (block 100). If the pointer is found (block 101), the memory block is not leaked and no leak error is reported (block 102). If no memory block is found (block 101), a leak exists and a leak error is reported (block 103). If it cannot be determined whether a pointer exists, that is, it is "unknown" (block 101), a leak also exists and a leak error is reported (block 104).

Figure 11:
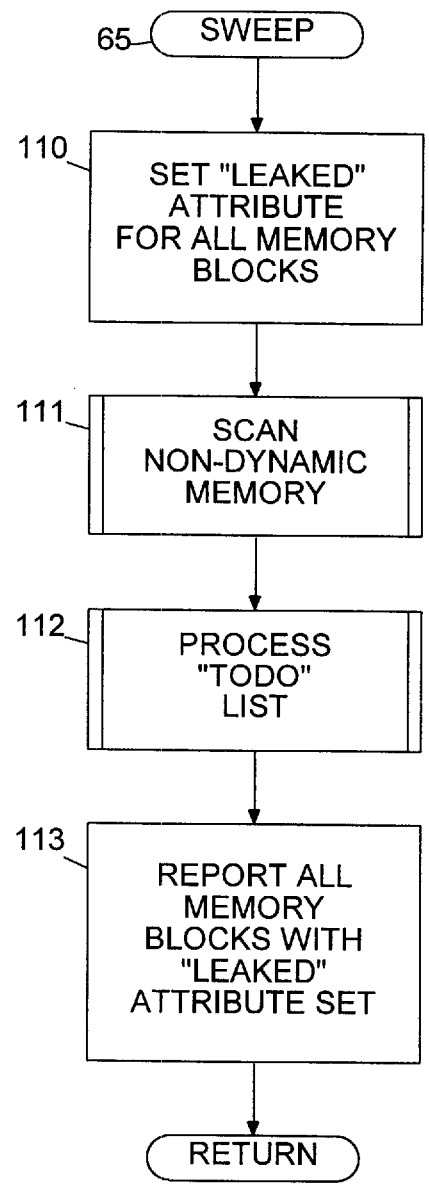
FIG. 11 is a flow diagram of a leak sweep routine.

Referring to FIG. 11, the routine for performing a leak sweep (block 65) is shown. Its purpose is to scan all available memory blocks for addresses to determine whether they are reachable from another memory block that is itself "reachable." If a memory block cannot be reached from another memory block, then it has been leaked, regardless of the reference count. This routine is performed statically upon the completion of the execution of the runtime program 12. First, a "Leaked" attribute is set for all memory blocks (block 110). Next, all non-dynamic memory, that is, globals and statics 21 and parts of the stack 23, are scanned for memory addresses (block 111) as further described hereinbelow in FIG. 12. A "ToDo" list is generated during the scan and processed upon the completion of the scan (block 112) as further described hereinbelow in FIG. 13. Finally, all memory blocks with the "Leaked" attribute set are reported as having been leaked (block 113).

Figure 12:
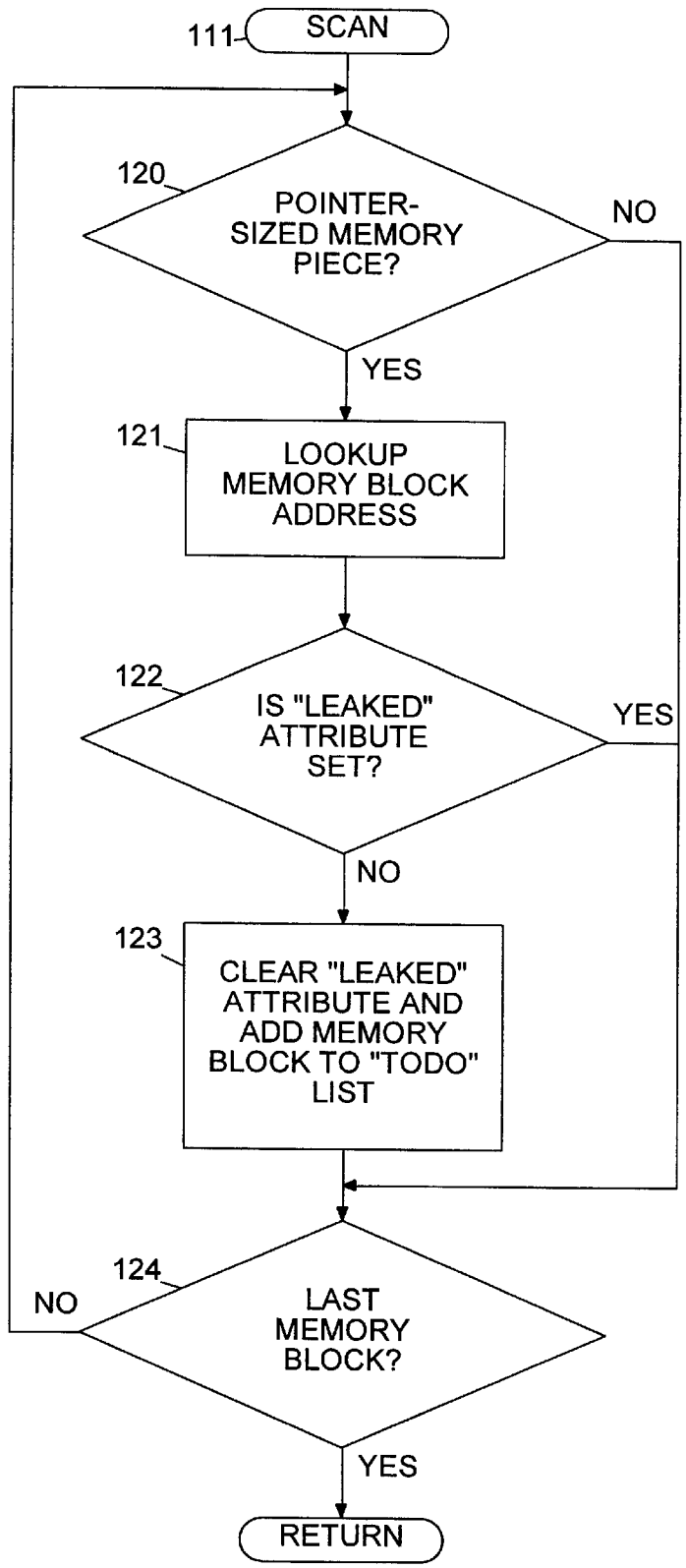
FIG. 12 is a flow diagram of a scan non-dynamic memory routine.

Referring to FIG. 12, the routine for scanning non-dynamic memory (block 111) is shown. Its purpose is to search a region of memory space for a memory address. It begins by looking for pointer-sized pieces of memory within each memory block (block 120). A "pointer-sized" piece of memory is a set of contiguous memory locations having a specific size particular to the machine architecture in which a memory pointer can be stored. For example, Sun workstations employ memory pointers that are four bytes (32 bits) in size. Consequently, the memory space is subdivided into four-byte pieces, each of which is assumed to be a pointer during the scanning process.

In the described embodiment, memory space can be searched in one of two ways. First, the memory space can be scanned for a pointer to all addresses corresponding to the beginning of a memory block. Second, the memory space can be searched for a pointer to all addresses corresponding to the beginning of a memory block or any other address within a memory block. If a pointer-sized memory piece is found (block 120), the address for the memory block is looked up (block 121).

There are three possible outcomes from a memory search. Either a pointer to the memory block was found, not found, or it was not possible to generate a conclusive answer. In the described embodiment, whenever a memory block "address" is found, a programmer-supplied filter is used to check the address for validity since the memory scanning assumes that all aligned pointer-sized memory pieces are pointers. The filter is used to help separate out pointer-sized pieces of memory that are not true memory addresses. Filtering also includes avoiding memory space which contains temporary variables or other items known not to actually be pointers, such as an array of characters that happen to contain the same pattern as a memory block address. Filtered "hits" do not count.

Preferably, a filter could, for example, look up an address in the symbol table and determine that it really is part of a character array and that the "hit" was accidental rather than actual. The programmer-supplied filter allows this to be accomplished. Thus, upon obtaining the memory blocked address, the routine will determine whether the "Leaked" attribute is set (block 122). If so, the "Leaked" attribute is cleared and the memory block is added to the "ToDo" list (block 123). Otherwise, if the "Leaked" attribute is set (block 122), the routine continues. The routine repeats until the last memory block has been processed (block 124).

Figure 13:
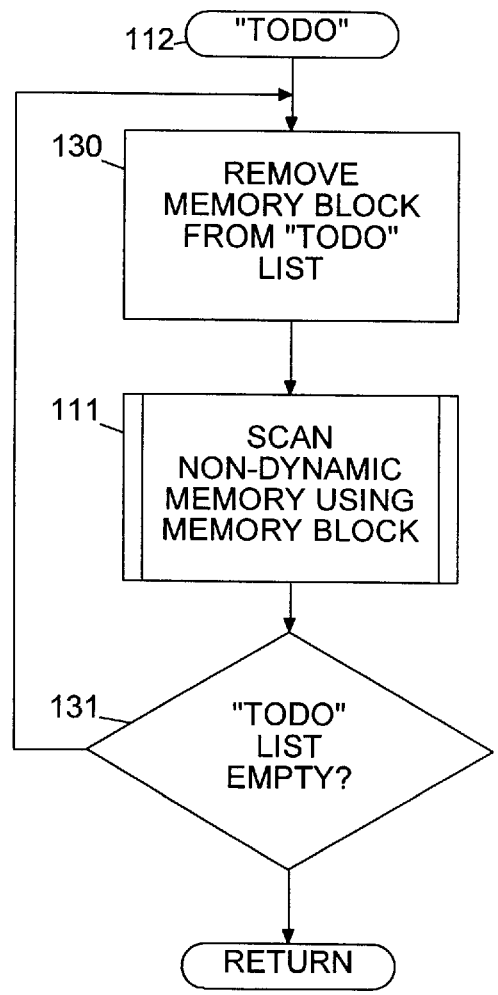
FIG. 13 is a process "ToDo" list routine.

Referring to FIG. 13, the routine for processing the "ToDo" list (block 112) is shown. Its purpose is to process each memory block in the "ToDo" list in a breadth first search manner, although other searching methodologies, including depth first searching, are feasible. First, the memory block is removed from the "ToDo" list (block 130). Next, the non-dynamic memory is scanned using the memory block obtained from the "ToDo" list (block 111) as shown in FIG. 12. The routine continues until the "ToDo" list is emptied (block 131). When the "ToDo" list is empty, all memory blocks marked with the "Leaked" attribute are known to be leaked and reported to the user.

While various embodiments of the invention have been particularly shown, it will be understood by those skilled in the art that the various changes in form and detail may be made without departing from the scope and spirit of the present invention, wherein:

What is claimed is:

1. A method using a computer for dynamically detecting leaked memory space in a computer program, the computer program comprising instrumentation routines for communicating runtime memory space conditions to a dynamic debugging system and having a memory space for storing dynamic data values, comprising the steps of:

performing a dynamic leak search for tracking allocated memory space using reference counting; and performing a static leak sweep for scanning blocks of the memory space to determine whether each such block of the memory space is reachable from another such block of the memory space.

2. A method according to claim 1, wherein the step of performing a dynamic leak search further comprises the steps of:

setting an indicator attribute if a pointer variable for referencing one of the blocks of the memory space has been passed or returned;

adjusting a reference count for tracking changes to the pointer variable if the pointer variable has been assigned; and performing a memory search if the reference count satisfies a predetermined condition for indicating that a memory leak may exist.

3. A method according to claim 2, wherein step of adjusting the reference count further comprises the steps of:

incrementing the reference count if a new block of the memory space is allocated; and decrementing the reference count if a new value is assigned to the pointer variable.

4. A method according to claim 2, wherein step of performing a memory search further comprises the steps of:

searching the memory space for a pointer variable containing a pointer to one of the blocks of the memory space;

indicating to the dynamic debugging system that no memory leak exists if the pointer to the one block of the memory space is found.

5. A method according to claim 1, wherein step of performing a memory sweep further comprises the steps of:

setting a leaked attribute for the blocks of the memory space for indicating whether any one of the blocks of the memory space is leaked;

scanning non-dynamic memory space for any such leaked block of the memory space whereby the leaked attribute is cleared for each such block of the memory space found to not be leaked during the scanning step;

processing a list of further blocks of the memory space to scan; and reporting each such block of the memory space that is leaked.

6. A method according to claim 5, wherein step of scanning non-dynamic memory space further comprises the steps of:

searching for a point-sized memory piece of the memory space;

looking up a memory block address for each such pointer-sized piece of the memory space found;

clearing the leaked attribute for the looked up memory block; and adding the block of the memory space located at the looked up memory block address to the list.

7. A method according to claim 5, wherein step of processing a list of further blocks of the memory space further comprises the steps of:

removing each such block of the memory space in the list of further blocks of the memory space; and performing the step of scanning non-dynamic memory space for leaked blocks of the memory space using the removed block of the memory space.

8. A system for dynamically detecting leaked memory space in a computer program, the computer program comprising instrumentation routines for communicating runtime memory space conditions to a dynamic debugging system and having a memory space for storing dynamic data values, comprising:

means for performing a dynamic leak search for tracking allocated memory space using reference counting; and means for performing a static leak sweep for scanning blocks of the memory space to determine whether each such block of the memory space is reachable from another such block of the memory space.

9. A system according to claim 8, wherein the means for performing a dynamic leak search further comprises:

means for setting an indicator attribute if a pointer variable for referencing one of the blocks of the memory space has been passed or returned;

means for adjusting a reference count for tracking changes to the pointer variable if the pointer variable has been assigned; and means for performing a memory search if the reference count satisfies a predetermined condition for indicating that a memory leak may exist.

10. A system according to claim 8, wherein the means for performing a memory sweep further comprises the steps of:

means for setting a leaked attribute for the blocks of the memory space for indicating whether any one of the blocks of the memory space is leaked;

means for scanning non-dynamic memory space for any such leaked block of the memory space whereby the leaked attribute is cleared for each such block of the memory space found to not be leaked during the scanning step;

means for processing a list of further blocks of the memory space to scan; and means for reporting each such block of the memory space that is leaked.

11. A method according to claim 10, wherein means for scanning non-dynamic memory space further comprises:

means for searching for a point-sized memory piece of the memory space;

means for looking up a memory block address for each such pointer-sized piece of the memory space found;

means for clearing the leaked attribute for the looked up memory block; and means for adding the block of the memory space located at the looked up memory block address to the list.

12. A storage medium encoded with computer readable program code for dynamically detecting leaked memory space in a computer program, the computer program comprising instrumentation routines for communicating runtime memory space conditions to a dynamic debugging system and having a memory space for storing dynamic data values, comprising:

means for performing a dynamic leak search for tracking allocated memory space using reference counting; and means for performing a static leak sweep for scanning blocks of the memory space to determine whether each such block of the memory space is reachable from another such block of the memory space.

13. A method using a computer for instrumenting a computer program to facilitate dynamic detection of leaked memory space in the computer program, the computer program being represented by code segments of source code written in a programming language, comprising the steps of:

analyzing each of the code segments of the source code for determining an appropriate type of instrumentation routine for the computer program;

identifying a location within the source code for placing a procedure call to the appropriate type of instrumentation routine, the instrumentation routine comprising one of a memory searching routine or a memory scanning routine;

instrumenting each code segment of the source code with the procedure call; and generating object code from the instrumented source code for execution on the computer in conjunction with a dynamic debugging system.

14. A method according to claim 13, wherein the instrumentation routine comprises one of a preprocessing instrumentation routine or a postprocessing instrumentation routine.

15. A method according to claim 13, wherein at least one of the code segments of the source code comprises a declaration of a dynamic pointer variable, further comprising the step of:

augmenting the at least one code segment of the source code with such a procedure call to a postprocessing memory searching routine located after the at least one code segment for communicating the declaration of the dynamic pointer variable to the dynamic debugging system.

16. A method according to claim 15, wherein at least one further of the code segments of the source code comprises an assignment of dynamically allocated memory space to the dynamic pointer variable, further comprising the step of:

augmenting the at least one further code segment of the source code with such a procedure call to a postprocessing memory searching routine located after the at least one further code segment for communicating the assignment of the dynamically allocated memory space to the dynamic pointer variable to the dynamic debugging system.

17. A method according to claim 15, wherein at least one further of the code segments of the source code comprises a reassignment of a previously assigned dynamically allocated memory space to the dynamic pointer variable, further comprising the step of:

augmenting the at least one further code segment of the source code with such a procedure call to a preprocessing memory searching routine located before the at least one further code segment for communicating the reassignment of the previously assigned dynamically allocated memory space to the dynamic pointer variable to the dynamic debugging system.

18. A method according to claim 15, wherein at least one further of the code segments of the source code comprises an assignment of a static value to the dynamic pointer variable, further comprising the step of:

augmenting the at least one further code segment of the source code with such a procedure call to a preprocessing memory searching routine located before the at least one further code segment for communicating the assignment of the static value to the dynamic pointer variable to the dynamic debugging system.

19. A method according to claim 13, wherein at least one of the code segments of the source code comprises a procedure call to an externally declared procedure, further comprising the steps of:

augmenting the at least one code segment of the source code with such a procedure call to a preprocessing memory searching routine located before the at least one code segment for communicating the status of the memory space before the externally declared procedure is called to the dynamic debugging system; and augmenting the at least one code segment of the source code with such a procedure call to a postprocessing memory searching routine located after the at least one code segment for communicating the status of the memory space after the externally declared procedure is called to the dynamic debugging system.

20. A method according to claim 13, further comprising the step of:

augmenting a last of the code segments of the source code with such a procedure call to a postprocessing memory scanning routine located after the last of the code segments for performing a leak sweep upon completion of the computer program.

* * * * *